(12) United States Patent
Bremmerer et al.

(10) Patent No.: US 12,043,347 B2
(45) Date of Patent: Jul. 23, 2024

(54) MODULAR VEHICLE PROTECTION SYSTEMS AND METHODS

(71) Applicant: Samish Solutions Inc., Bellingham, WA (US)

(72) Inventors: Joshua B. Bremmerer, Bellingham, WA (US); Jonathan Peter Bremer, Bellingham, WA (US)

(73) Assignee: Samish Solutions Inc., Bellingham, WA (US)

(*) Notice: Subject to any disclaimer, the term of this patent is extended or adjusted under 35 U.S.C. 154(b) by 272 days.

(21) Appl. No.: 17/362,640

(22) Filed: Jun. 29, 2021

(65) Prior Publication Data
US 2022/0009593 A1  Jan. 13, 2022

Related U.S. Application Data

(60) Provisional application No. 63/047,096, filed on Jul. 1, 2020.

(51) Int. Cl.
*H02J 9/00* (2006.01)
*B60H 1/00* (2006.01)
(Continued)

(52) U.S. Cl.
CPC ......... *B63B 17/02* (2013.01); *B60H 1/00785* (2013.01); *B60H 3/024* (2013.01); *B63B 43/00* (2013.01); *B60L 15/20* (2013.01)

(58) Field of Classification Search
CPC ........ H05K 7/20727; H02J 9/00; B60L 15/20; B60H 1/00785; B60H 3/024; B63B 43/00; B63B 17/02
(Continued)

(56) References Cited

U.S. PATENT DOCUMENTS

2002/0080575 A1* 6/2002 Nam .................. H05K 7/20727
361/679.48
2003/0217683 A1 11/2003 Heckman
(Continued)

FOREIGN PATENT DOCUMENTS

CN  102607106 A  * 7/2012  ............... F24F 11/30
CN  204078037 U  * 1/2015  ............. B63B 59/00
(Continued)

OTHER PUBLICATIONS

Malik, Azra, and Ahteshamul Haque. an abstract of "Fault-Tolerant Converter Design for Photovoltaic System." Fault Analysis and its Impact on Grid-connected Photovoltaic Systems Performance (2022): 255-289. (Year: 2022).*
(Continued)

*Primary Examiner* — Cuong H Nguyen
(74) *Attorney, Agent, or Firm* — Michael R. Schacht; Schacht Law Office, Inc.

(57) ABSTRACT

A boat protection system comprises a hub system and at least one auxiliary module. The hub system comprises a hub housing defining at least one hub guide portion, at least one hub electrical connector supported by the hub housing, and a DC bus operatively connected to the at least one hub electrical connector. The at least one auxiliary module comprises an auxiliary housing defining at least one auxiliary guide portion, at least one auxiliary electrical connector supported by the auxiliary housing, and at least one functional component. At least one hub guide portion engages at least one auxiliary guide portion to support at least auxiliary housing relative to the hub housing such that at least one hub electrical connector engages at least one auxiliary electrical connector. The at least one functional component of the at least one auxiliary module is operatively connected to the DC bus.

9 Claims, 12 Drawing Sheets

(51) Int. Cl.
*B60H 3/02* (2006.01)
*B63B 17/02* (2006.01)
*B63B 43/00* (2006.01)
*G06F 1/16* (2006.01)
*B60L 15/20* (2006.01)

(58) Field of Classification Search
USPC ............ 361/679.48, 679.45, 686; 114/201 A
See application file for complete search history.

(56) References Cited

U.S. PATENT DOCUMENTS

| | | | | |
|---|---|---|---|---|
| 2016/0207414 | A1* | 7/2016 | Watanabe | ............... B60L 15/20 |
| 2018/0315569 | A1 | 11/2018 | Hoffmann | |
| 2019/0334706 | A1* | 10/2019 | Fortenberry | .......... H04L 9/0819 |

FOREIGN PATENT DOCUMENTS

| | | | | |
|---|---|---|---|---|
| CN | 204078037 U | | 1/2015 | |
| CN | 110536850 B | * | 1/2022 | ........... B65G 69/008 |
| DE | 3225349 A1 | * | 1/1984 | ............. B63B 19/28 |
| DE | 3815138 A1 | | 11/1988 | |
| DE | 4327866 C1 | * | 9/1994 | ......... B60H 1/00492 |
| DE | 4327866 C1 | | 9/1994 | |
| DE | 102006024594 A1 | * | 11/2007 | ................ H02J 3/04 |
| DE | 102006024594 A1 | | 11/2007 | |
| DE | 102017002997 B3 | * | 4/2018 | ............. B60H 1/32 |
| EP | 2090508 A3 | * | 6/2011 | ............ B63H 23/24 |
| FI | 3815138 A1 | * | 11/1988 | ............. B63B 19/21 |
| JP | 2014100925 A | * | 6/2014 | ............. B60H 1/00 |
| KR | 20120005837 U | | 1/2012 | |
| KR | 20120005837 U | * | 1/2014 | .............. B63B 9/06 |

OTHER PUBLICATIONS

Srinivas, Neeraj. Collocation Method and Model Predictive Control for Accurate Landing of a Mars EDL vehicle. Diss. Virginia Tech, 2021. (Year: 2021).*
NASA Technology F09R Large Space Systems (NASA SP-7046-(19), Nov. 1988 (Year: 1988).*
International Searching Authority, International Search Report, Oct. 14, 2021, 3 pages.
International Searching Authority, Written Opinion of the International Searching Authority, Oct. 14, 2021, 7 pages.

* cited by examiner

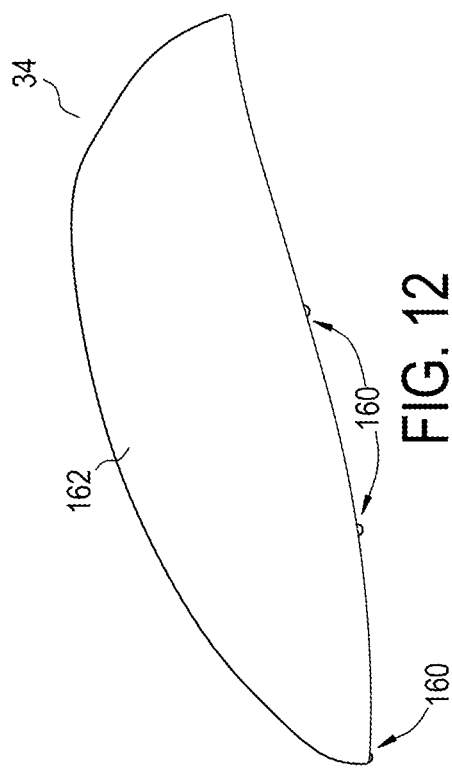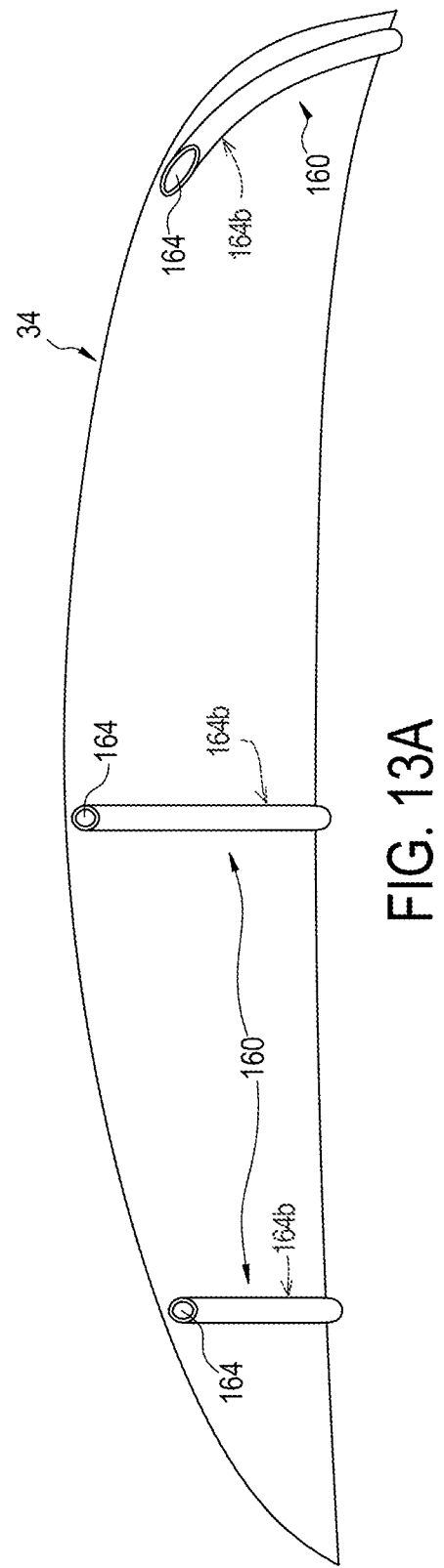

MODULAR VEHICLE PROTECTION SYSTEMS AND METHODS

RELATED APPLICATIONS

This application, U.S. patent application Ser. No. 17/362,640 filed Jun. 29, 2021, claims benefit of U.S. Provisional Application Ser. No. 63/047,096 filed Jul. 1, 2020, the contents of which are incorporated herein by reference.

TECHNICAL FIELD

The present invention relates to the protection of vehicles and, more specifically, to modular vehicle protection systems and methods configured to maintain desired environmental conditions within a vehicle such as a boat when not in use.

BACKGROUND

The present invention may be used in connection with a number of types of vehicles but is of particular significance when applied to boats. The present invention will thus be disclosed herein in the context of a boat with the understanding that the principles of the present invention may be applied to other vehicles such as automobiles, trucks, recreational vehicles, trailers, and the like.

Boats, especially pleasure boats, are often used for short durations and then left moored or trailered for extended periods of time between uses. A boat hull is typically made of inert materials that are highly resistant to damage from the elements. Certain components of a boat, however, are made of materials that are susceptible to damage when left exposed to the elements for extended periods of time (e.g., wood, textiles, plastics). Accordingly, a cover is typically arranged over exposed areas of a boat when not in use to protect components that may be damaged when exposed to the elements.

Boat covers provide only limited protection to components that are susceptible to damage. A boat cover can prevent sun and rain from reaching the interior of the boat and damaging susceptible components, but conventional boat covers do not prevent damage to damageable components from temperature and/or humidity. Further, boat covers typically must be tautly supported, and any sagging of the cover over time may allow water to pool up, collapse the cover, and expose the damageable components of the boat to the elements. In addition, a boat cover does not provide substantial protection to damage associated with low temperatures and/or humidity.

The need thus exists for vehicle protection systems and methods that are capable of protecting damageable boat components under a wide range of environmental conditions.

SUMMARY

The present invention may be embodied as a boat protection system comprises a hub system and at least one auxiliary module. The hub system comprises a hub housing defining at least one hub guide portion, at least one hub electrical connector supported by the hub housing, and a DC bus operatively connected to the at least one hub electrical connector. The at least one auxiliary module comprises an auxiliary housing defining at least one auxiliary guide portion, at least one auxiliary electrical connector supported by the auxiliary housing, and at least one functional component. At least one hub guide portion engages at least one auxiliary guide portion to support at least auxiliary housing relative to the hub housing such that at least one hub electrical connector engages at least one auxiliary electrical connector. The at least one functional component of the at least one auxiliary module is operatively connected to the DC bus The present invention may also be embodied as a vehicle protection system comprising a cover, a hub system, and at least one auxiliary module. The cover comprises a structural system defining an air chamber and a skin system. The hub system comprises a hub housing defining at least one hub guide portion, at least one hub electrical connector supported by the hub housing, and a DC bus operatively connected to the at least one hub electrical connector. The at least one auxiliary module comprises an auxiliary housing defining at least one auxiliary guide portion, at least one auxiliary electrical connector supported by the auxiliary housing, and an inflator operatively connected to the air chamber of the structural system. At least one hub guide portion engages at least one auxiliary guide portion to support at least auxiliary housing relative to the hub housing such that at least one hub electrical connector engages at least one auxiliary electrical connector. The inflator of the at least one auxiliary module is operatively connected to the DC bus, where the inflator operates based on a DC power signal on the DC bus to introduce pressurized air into the air chamber of the structural system.

The present invention may also be embodied as a vehicle protection system comprising a hub system and at least one auxiliary module. The hub system comprises a hub housing defining at least one hub guide portion, a plurality of hub electrical connectors supported by the hub housing, a DC bus operatively connected to the plurality of hub electrical connectors, and a main controller. The at least one auxiliary module comprises an auxiliary housing defining at least one auxiliary guide portion, at least one auxiliary electrical connector supported by the auxiliary housing, and at least one functional component selected from the group of functional components comprising a heater, a dehumidifier, a battery, solar power module, and an inflator. Each of the functional components is operatively connected to the DC bus through the at least one auxiliary electrical connector and the at least one hub electrical connector. The at least one hub guide portion engages at least one auxiliary guide portion to support at least auxiliary housing relative to the hub housing such that at least one hub electrical connector engages at least one auxiliary electrical connector. The main controller is operatively connected to the at least one auxiliary module.

The present invention may also be embodied as a method of protecting a vehicle comprising the following steps. A hub system is provided, the hub system comprising a hub housing defining at least one hub guide portion, at least one hub electrical connector supported by the hub housing, and a DC bus operatively connected to the at least one hub electrical connector. At least one auxiliary module is provided, each auxiliary module comprising an auxiliary housing defining at least one auxiliary guide portion, at least one auxiliary electrical connector supported by the auxiliary housing, and at least one functional component. The at least one auxiliary module is displaced relative to the hub housing such that at least one hub guide portion engages at least one auxiliary guide portion to support at least auxiliary housing relative to the hub housing such that at least one hub electrical connector engages at least one auxiliary electrical connector and the at least one functional component of the at least one auxiliary module is operatively connected to the DC bus.

BRIEF DESCRIPTION OF THE DRAWINGS

FIG. 12 is a perspective view of the first example cover system;

FIG. 13A is a section view of the first example cover system taken along lines 13A-13A in FIG. 11;

DETAILED DESCRIPTION

Figure 1A:
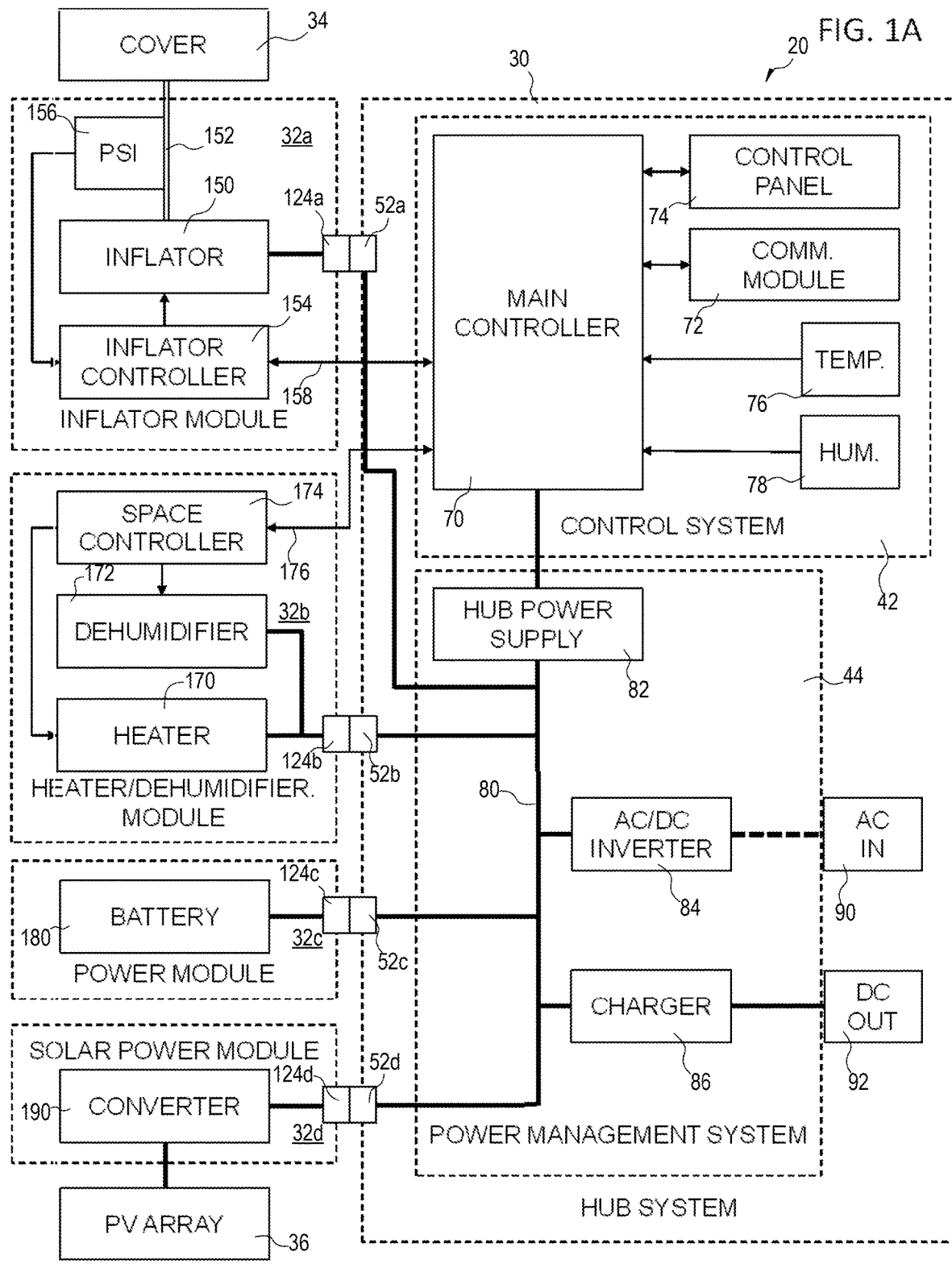
FIG. 1A is a schematic block diagram illustrating a first example vehicle protection system of the present invention.

Referring initially to FIG. 1A of the drawing, depicted therein is a first example vehicle protection system 20 of the present invention. The first example vehicle protection system 20 is configured to protect a vehicle such as a boat 22 as shown, for example, in FIGS. 16-20. The example boat 22 is or may be conventional and will be described herein only to that extent helpful to a complete understanding of the present invention. As discussed above, vehicles other than boats, such as cars, motorcycles, and recreational vehicles, may be protected by the vehicle protection system 20 of the present invention.

FIG. 1A illustrates that the first example vehicle protection system 20 comprises a hub system 30 and one or more auxiliary modules 32. Each auxiliary module 32 comprises functional components that provides the vehicle protection system 20 with different capabilities. The example boat depiction system 20 depicted in FIG. 1A comprises four example of the auxiliary modules 32: an inflator auxiliary module 32a operatively connected to a boat cover 34, a heater/dehumidifier auxiliary module 32b, an auxiliary power module 32c, and an auxiliary solar power module 32d operatively connected to a photovoltaic array 36. While four of the auxiliary modules 32 are depicted in FIG. 1A, a vehicle protection system of the invention may include fewer or more than four auxiliary modules 32 as will be described in further detail below.

The first example vehicle protection system 20 is thus configured to perform at least one of the following functions: coverage of at least a portion of the boat 22; dehumidification and/or heating of at least a portion of the boat 22; standby electrical power in the event that power to the vehicle protection system 20 is otherwise unavailable; and/or electrical power from the sun when the sun is shining. The various auxiliary modules 32 are detachably attachable to the hub system 30 such that a user of the first example boat system 20 may select only those auxiliary modules required for a specific boat 22 and the environmental conditions in which the boat 22 is to be stored and/or used.

With the foregoing general understanding of the construction and operation of the invention in mind, the details of construction and operation of the first example vehicle protection system 20 will now be described. In this application, a reference character without letters appended thereto generically refers to a structure while the same reference character with letters appended thereto refers to a particular example of that structure. Reference characters used without appended letters in the written specification shall thus be considered as being depicted in the drawing by the same reference characters used with appended letters in the drawing.

Figure 7:
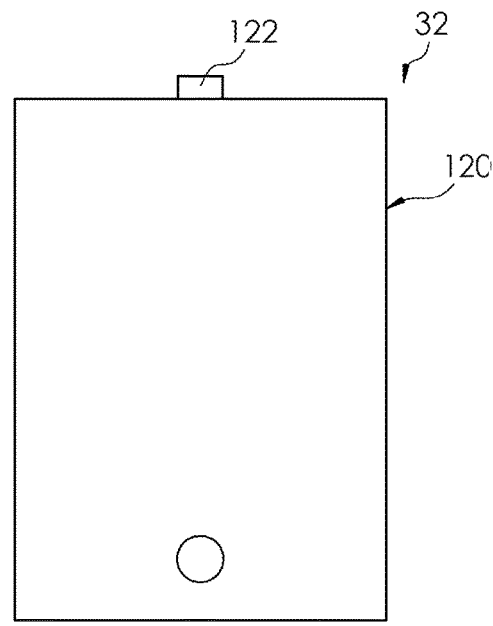
FIG. 7 is a front elevation view of the first example auxiliary module.
Figure 8:
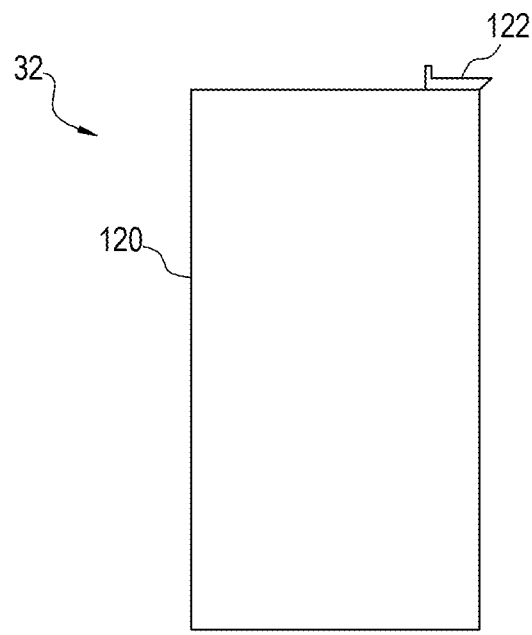
FIG. 8 is a side elevation view of the first example auxiliary module.
Figure 9:
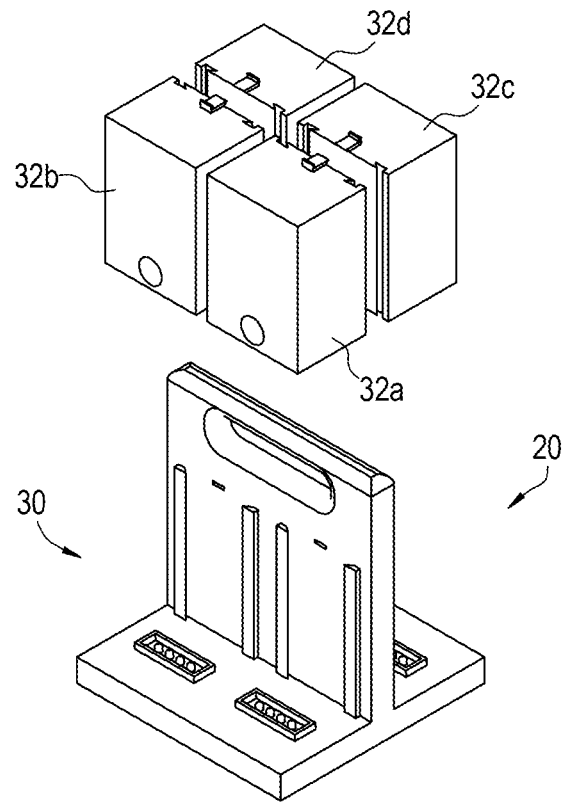
FIG. 9 is a perspective view illustrating a first step of a process of securing a plurality of the first example auxiliary modules to the first example hub system.
Figure 10:
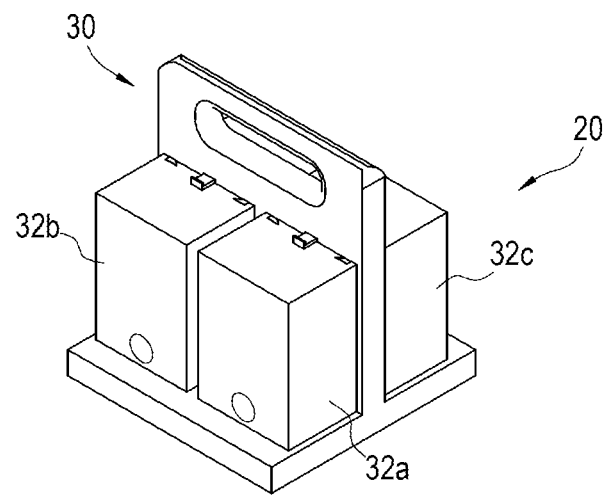
FIG. 10 is a perspective view illustrating a second step of the process of securing a plurality of the first example auxiliary modules to the first example hub system.
Figure 11:
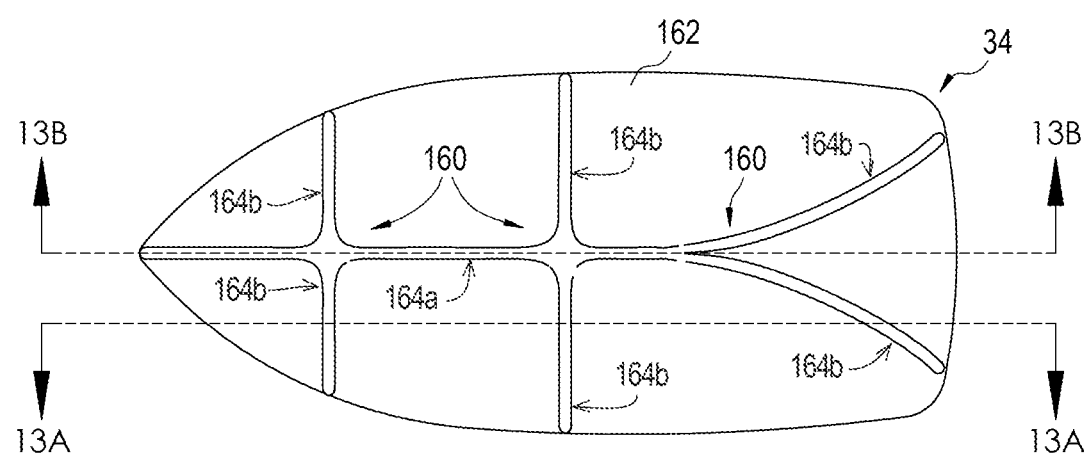
FIG. 11 is a bottom plan view of a first example cover system that may form a part of an example vehicle protection system of the present invention.

Referring now to FIGS. 1-4 of the drawing, the example hub system 30 will be explained in further detail. The example hub system 30 comprises a hub assembly 40 (FIGS. 2-3), a control system 42 (FIG. 1), and a power management system 44 (FIG. 1). The example hub assembly 40 comprises a hub housing 50 and one or more hub electrical connectors 52. As perhaps best shown in FIGS. 7 and 18, the example hub assembly 50 comprises first, second, third, and fourth example hub electrical connectors 52a, 52b, 52c, and 52d. The exact format and structure of the hub electrical connectors 52 is not critical but should be capable of forming an electrical connection that allows the transmission of power and, optionally, communications signals as will be described in further detail below.

The example hub housing 50 comprises a main wall 54 and at least one lateral wall 56. The example hub housing 50 defines first and second lateral walls 56a and 56b that extend in opposite directions from a lower end of the main wall 54. The example housing 50 may be provided with perimeter wall(s) (not shown) and/or cover(s) (not shown) configured to define closed and/or sealed chamber(s) that provides additional protection for electrical components of the example vehicle protection system 20 as will be described in further detail below.

The example hub housing 50 further defines at least one hub guide portion 60; each hub guide portion 60 comprises at least one guide rails 62 extending from the main wall 54. The example hub guide portion(s) 60 define first and second guide rails 62a and 62b. A latch recess 64 is formed in the main wall 54 between each pair of guide rails 62a and 62b, and a handle opening 66 is formed in the main wall 54 to facilitate lifting and carrying of the example hub system 30. Each hub guide portion 60 is arranged in a desired orientation relative to one hub electrical connector 52 and one latch recess 64. The example hub housing 50 defines four hub guide portions 60a, 60b, 60c, and 60d.

FIG. 1A illustrates that the example control system 42 comprises a main controller 70. The example control system 42 further comprises at least one communications module 72 and a control panel 74. The example main controller 70 and communications module 72 are supported within the hub housing 50. The example main controller 70 is a processor running software capable of implementing any logic necessary to control the operation of the first example vehicle protection system 20 as will be described in detail below. The example communications module 72 comprises one or more of a WiFi communications system, a Bluetooth communications system, and a cellular telephone communications system. The example control panel 74 is supported by the hub housing 50 but may be formed in addition or instead by a separate device such as a smart phone (not shown) or computer (not shown) in communication with the main controller 70 through the communications module 72. Data collected and processed by the main controller 70 may be transmitted to a remote database (not shown) for further processing and/or monitoring. The remote database may in turn be connected to an app (not shown) running on a user's computing device to allow the user or the user's agent to be notified of any event possibly requiring attention from and/or action by the user or the user's agent.

The example control system 42 further comprises a temperature sensor 76 and a humidity sensor 78. The example temperature sensor 76 and humidity sensor 78 are supported by the hub housing 50 to detect temperature and humidity, respectively, in the space surrounding the hub system 30 but, as will be described in further detail below, may be located elsewhere to detect temperature and humidity as appropriate.

The example power management system 44 comprises a DC bus 80, a hub power supply circuit 82, an AC/DC inverter circuit 84, and a charger circuit 86. The hub power supply circuit 82, the AC/DC inverter circuit 84, and the charger circuit 86 are or may be conventional and will not be described herein beyond that extent helpful to a complete understanding of the present invention.

In the example power management system 44, the AC/DC inverter circuit 82, the hub power supply circuit 84, and the charger circuit 86 are operatively connected to the DC bus 80. The hub power supply 82 generates a DC power signal appropriate for providing power to the control system 42. The example AC/DC inverter circuit 84 is also connected to an AC power input plug 90 to allow the AC/DC inverter circuit 84 to generate a DC power signal appropriate for the DC bus 80 based on utility power. The charger circuit 86 is connected to a DC outlet assembly 92 to allow the charger circuit 86 to generate a DC power signal based on DC power signal on the DC bus 80 appropriate for charging a battery as will be described in further detail below.

The example DC bus 80 is a 12V bus. A 12V bus is standard in the marine and transportation industries and accommodates conventional inverters, chargers, converters, and batteries used in the marine and transportation industries. However, the DC bus 80 may be configured to operate at voltages other than 12V. The example control system 42 conventionally operates at 5 VDC, so the example hub power supply 82 is configured to generate a regulated 5 VDC appropriate for the control system 42. The example AC/DC inverter 84 is configured to generate 12 VDC from a standard utility AC power signal. The example charger 86 is configured to provide a regulated 12 VDC power signal from the 12 VDC power signal on the DC bus 80, and the regulated 12 VDC power signal generated by the example charger 86 is appropriate for charging a conventional 12V battery or array of 12V batteries connected in parallel.

The example hub electrical connector(s) 52 is(are) configured to be connected to the DC bus 80 such that 12 VDC is available for use by the auxiliary module(s) 32 as will be described in further detail below. While not shown for purposes of clarity in FIG. 1A, the example hub electrical connector(s) 52 may be configured to carry communications signals between the control system 42 and the auxiliary module(s) 32.

Figure 1B:
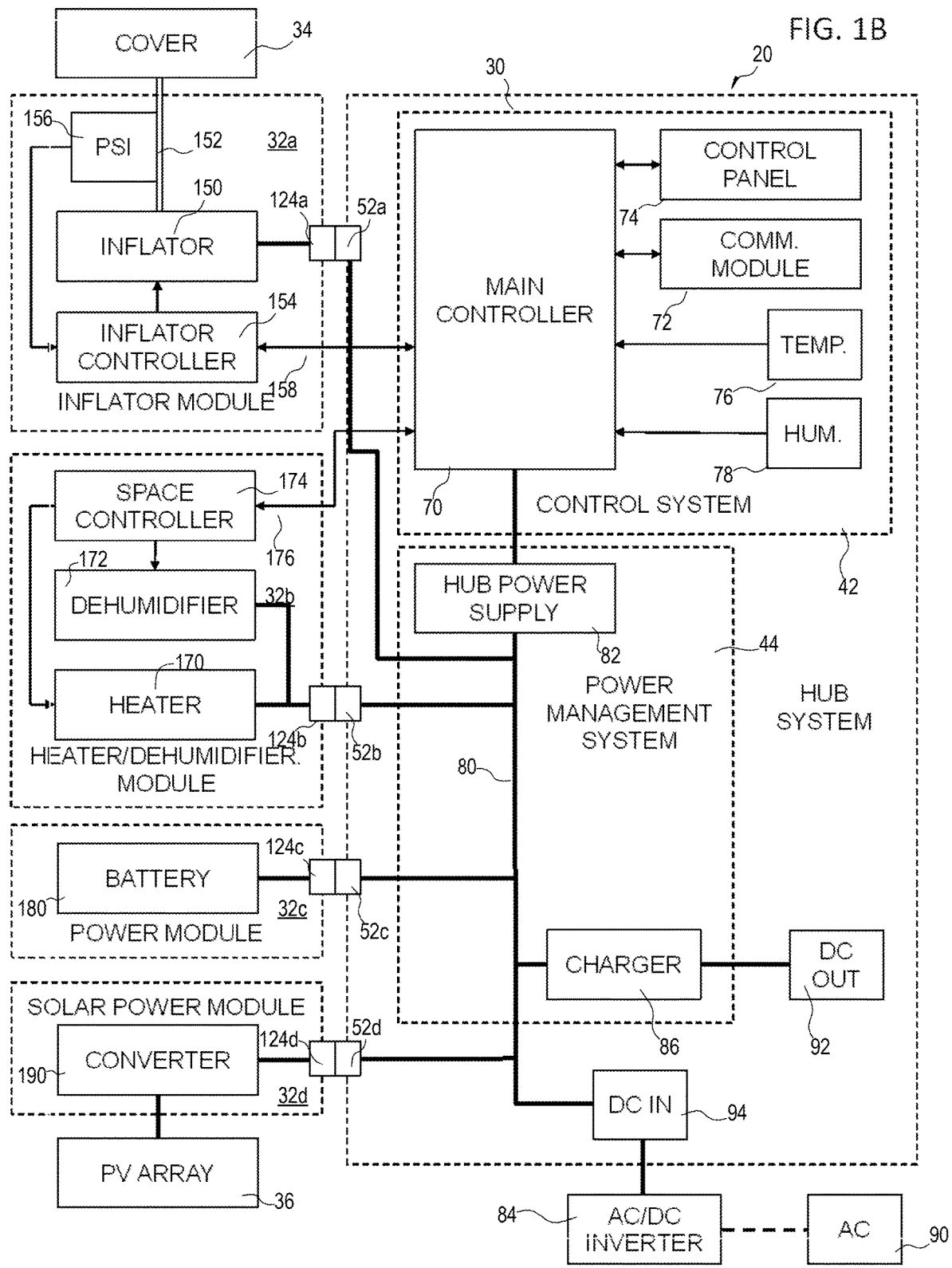
FIG. 1B is a schematic block diagram illustrating a second example vehicle protection system of the present invention.
Figure 2:
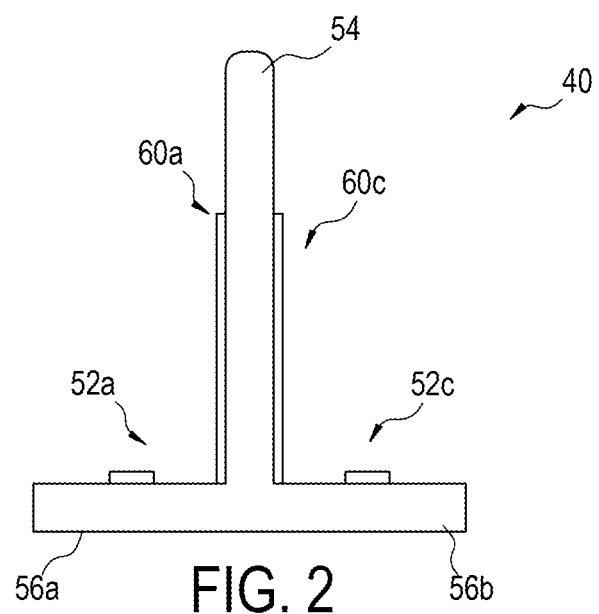
FIG. 2 is an end elevation view of a first example hub system that may form a part of an example vehicle protection system of the present invention.
Figure 3:
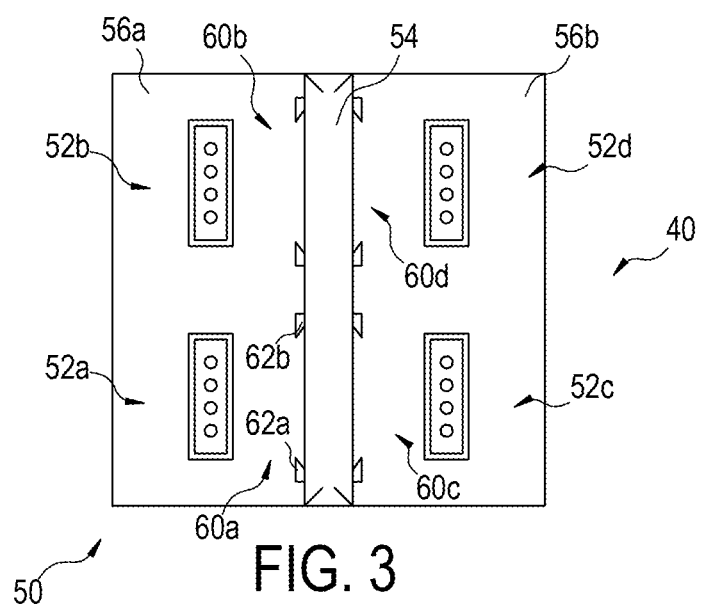
FIG. 3 is a top plan view of the first example hub system.
Figure 4:
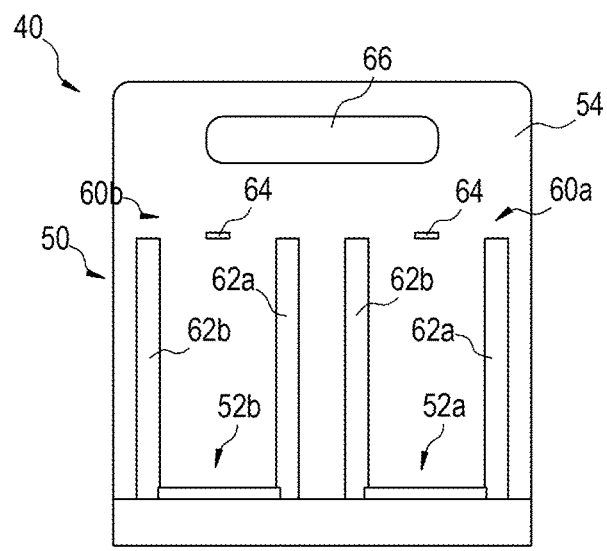
FIG. 4 is a side elevation view of the first example hub system.
Figure 5:
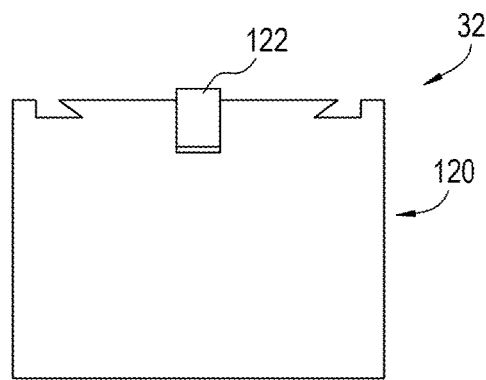
FIG. 5 is a top plan view of a first example auxiliary module of the present invention.
Figure 6:
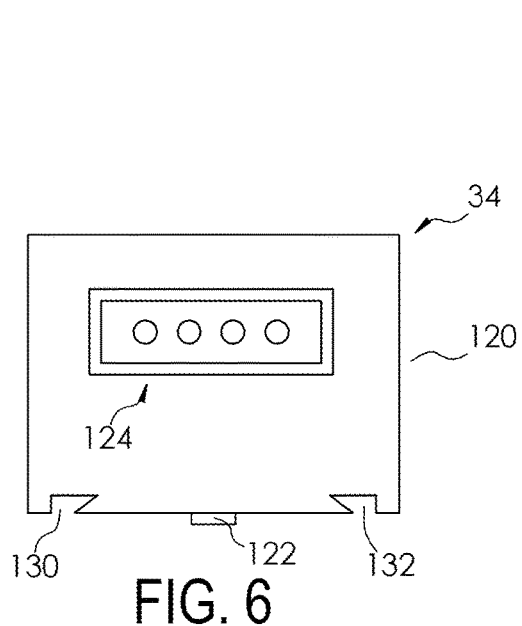
FIG. 6 is a bottom plan view of the first example auxiliary module.

Referring now for a moment to FIG. 1B, depicted therein is a second example vehicle protection system 20b. The second example vehicle protection system 20b is or may be the same as the first example vehicle protection system 20a described above except as noted herein. In particular, the second example vehicle protection system 20b comprises a DC IN port 94 operatively connected to the DC bus 80, and the AC/DC inverter 84 is external to the hub system 30. The external AC/DC inverter 84 is operatively connected to the DC IN port 94 to allow a DC power signal generated by the external AC/DC inverter 84 from the AC source 90 to be applied to the DC bus 80.

Referring now to FIGS. 1 and 5-10, the construction of the example auxiliary module(s) 32 and the interaction of the example auxiliary modules 32 with the example hub system 30 will now be described in further detail.

FIGS. 5-8 illustrate that each auxiliary module(s) 32 comprises an auxiliary housing 120, an auxiliary electrical connector 122, and a latch member 124. The auxiliary housing 120 further defines at least one auxiliary guide portion 130. Each of the example auxiliary guide portion(s) 130 defines at least one guide slot(s) 132. When any of the hub guide portion(s) 60 engage any of the auxiliary guide portion(s) 130, a guide system is formed that limits movement of the auxiliary housing(s) 120 relative to the hub housing 50.

In the example auxiliary module(s) 32, each auxiliary guide portion 130 defines first and second guide slots 132a and 132b. The first and second guide slots 120a and 132b are in a predetermined relationship to the auxiliary electrical connector 122 supported by the auxiliary housing 120 and the latch member 124 supported by the auxiliary housing 120. In addition, the example first and second guide slots 132a and 132b are sized, dimensioned, and located to receive the first and second guide rails 62a and 62b, respectively, of any of the hub guide portion(s) 60. Accordingly, when any pair of guide slots 132a and 132b receives any pair of guide rails 62a and 62b, a guide system is formed that limits movement of the auxiliary housing(s) 120 relative to the hub housing 50.

As shown in FIG. 1A, the first example vehicle protection system 20 comprises first, second, third, and fourth example auxiliary electrical connectors 122a, 122b, 122c, and 122d. The exact format and structure of the auxiliary electrical connector(s) 122 is not critical but should be capable of engaging the hub electrical connector(s) 52 to form electrical connection(s) capable of transmitting power and, optionally, communications signals as will be described in further detail below. Desirably, the first connectors 52 engage the second connectors 122 such that the electrical connection(s) so formed are water resistant. The electrical connections formed by the first and auxiliary electrical connectors 52 and 122 may take forms other than those described and depicted herein.

The guide systems formed by the guide rail(s) 62 and the guide slot(s) 130 ensure that the auxiliary housing(s) 120 is(are) displaced relative to the hub housing 50 in an insertion direction along a guide axis such that: (a) the first and auxiliary electrical connectors 52 and 122 engage each other to form an operable electrical connection between the hub system 30 and the auxiliary module(s) 32 and (b) the latch member 124 engages the latch recess 64 to form a latch system. Typically, a biasing member (not shown) biases the latch member 124 from an unlatched position to a latched position. When in the latched position, the latch member 124 may engage the latch recess 64. When in the unlatched position, the latch member 124 cannot engage the latch recess 64.

When the first and auxiliary electrical connectors 52 and 124 are engaged and the latch system is formed, the guide system(s) inhibit relative movement between the auxiliary housing(s) 120 to the hub housing 50 except in a removal direction along the guide axis, and the latch system inhibits movement of the auxiliary housing(s) 120 in the removal direction along the guide axis. The guide system(s) and latch system(s) thus secure the auxiliary housing(s) 120 relative to the hub housing 50 such that the first and auxiliary electrical connectors 52 and 122 form and maintain electrical connections as described herein.

To remove the auxiliary housing(s) 120 from the hub housing 50, the latch member 124 is moved into the unlatched position (e.g., out of the latch recess 64) to place the latch system(s) in an unlatched position to allow movement of the auxiliary housing(s) 120 in the removal direction along the guide axis relative to the hub housing 50. The guide system(s) and latch system(s) may take forms other than those described and depicted herein.

The example auxiliary modules 32a, 32b, 32c, and 32d will be described in further detail.

Initially, in FIG. 1A, all of the first, second, third, and fourth auxiliary modules 32a, 32b, 32c, and 32d are shown connected to the example hub system 30. However, any one or more of the first, second, third, and fourth auxiliary modules 32a, 32b, 32c and 32 may not be used. Further, the example vehicle protection system can be used without any of the first, second, third, and fourth auxiliary modules 32a, 32b, 32c, and 32d.

Figure 16:
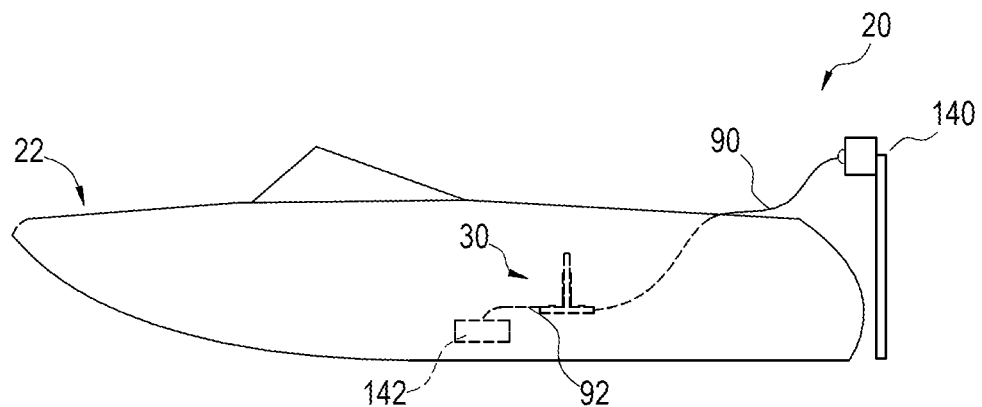
FIG. 16 is a partial schematic side elevation view illustrating the first example vehicle protection system in a first example configuration.

FIGS. 1 and 16 illustrate that the hub system 30 may be used in a first configuration as a trickle charger without any of the auxiliary modules 32. In particular, the AC input assembly 90 is connected to shore power 140 and the DC output assembly 92 is connected to a vehicle battery 142 on the boat 22. In this case, the AC/DC inverter 84 generates a DC signal on the DC bus 80 from the shore power 140, and the charger 86 generates a DC power signal appropriate for charging vehicle battery 142.

Figure 17:
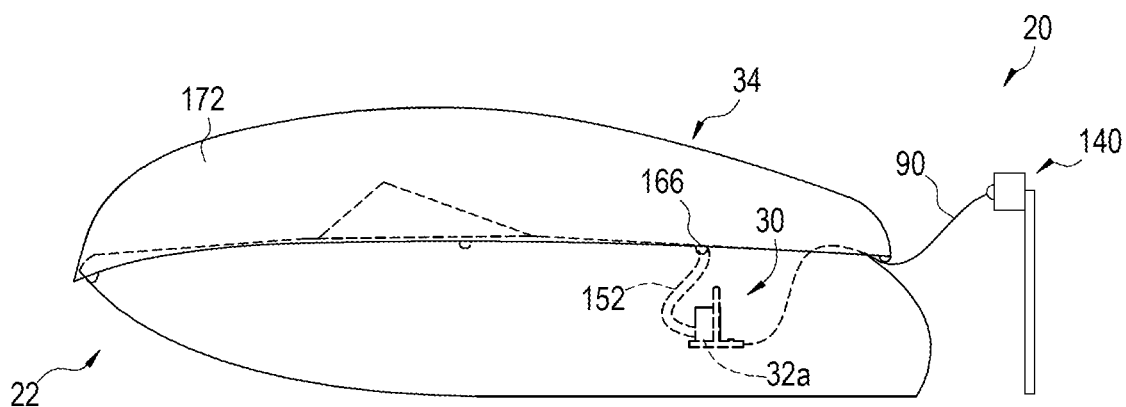
FIG. 17 is a partial schematic side elevation view illustrating the first example vehicle protection system in a second example configuration.

FIG. 17 illustrates that the first example vehicle protection system 20 may be used in a second configuration in connection with the example boat cover 34. FIG. 1A illustrates that the example first auxiliary module 32a is an inflator module comprising the following functional components: an inflator 150, an inflator tube 152, an inflator controller 154, and a pressure sensor 156. The example inflator 150 is electrically connected to a first auxiliary electrical connector 124a forming a part of the example first auxiliary module 32a. The first auxiliary electrical connector 124a is in turn electrically connected to the first hub electrical connector 52a of the hub system 30. The example inflator 150 is thus electrically connected to the DC bus 80. The example inflator controller 154 is operably connected to the pressure sensor 156, and the example pressure sensor 156 is arranged to detect a pressure of air within the inflator tube 152.

To facilitate programming and/or control of the example first auxiliary module 32a (e.g., through the control panel 74), the example inflator controller 154 may be electrically connected, wirelessly or through wires as shown at 158, to the main controller 70.

FIGS. 11-15 illustrate that the example boat cover 34 comprises a structural system 160 and a skin system 162. As perhaps best shown in FIGS. 13A and 13B, the example structural system 160 defines at least one air chamber 164 configured to support the skin system 162 in a desired orientation relative to the boat 22 when pressurized air is contained within the at least one air chamber 164. The example air chamber 164 comprises a main chamber portion 164a extending at least a portion of the example boat cover 34 along a longitudinal axis of the boat cover 34 and at least one lateral chamber portion 164b that extends laterally from the main chamber portion 164a in a direction at an angle to the longitudinal axis of the boat cover 34. As perhaps best shown in FIG. 11, the example structural system 160 thus comprises a single main chamber portion 164a and six lateral portions 164b.

The example air chamber 164 further defines a chamber inlet 166 adapted to be connected to the example inflator tube 152. The skin system 162 is typically an appropriate fabric or membrane capable of inhibiting entry of water into the boat 22 and/or inhibiting of sunlight from reaching the interior of the boat 22.

Figure 13B:
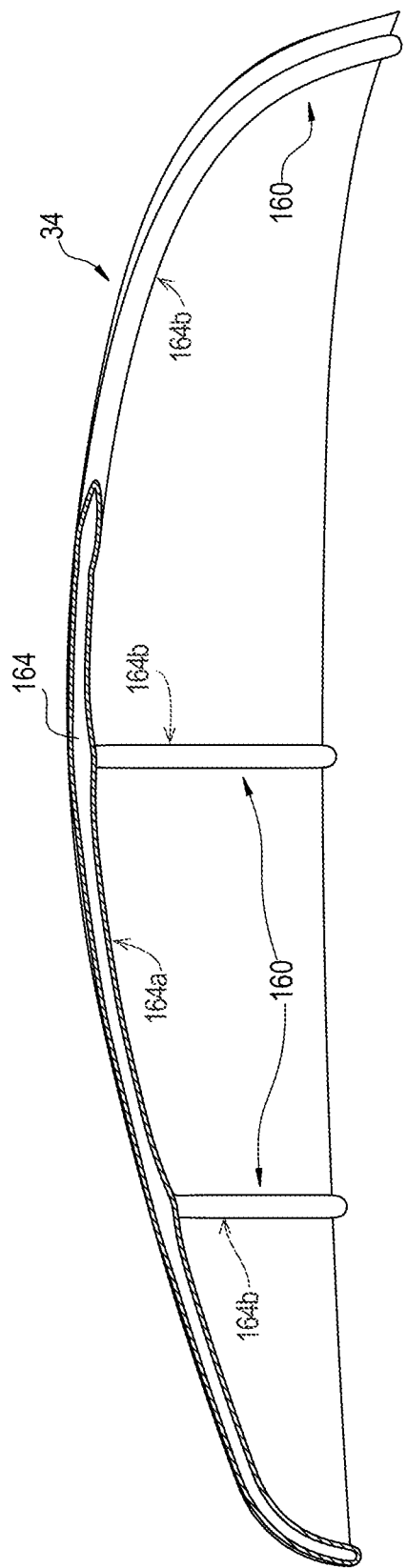
FIG. 13B is a section view of the first example cover system taken along lines 13B-13B in FIG. 11.
Figure 14:
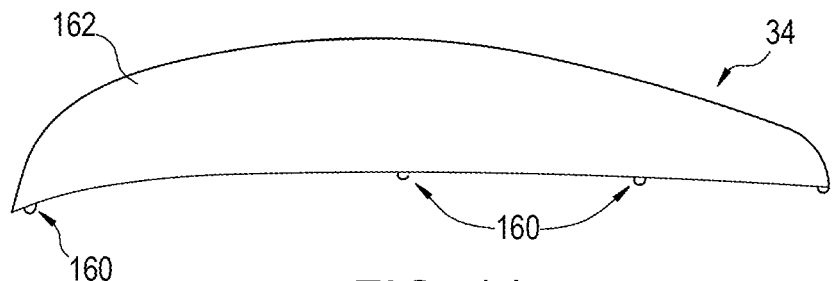
FIG. 14 is a side elevation view of the first example cover system.

When pressurized air is introduced into the structural system 160, the structural system inflates to give shape to the skin system 162. In the example boat cover 34, the example main chamber portion 164a extends from the forwardmost (bow) portion of the boat cover 34 to approximately ⅔ of the way to the rearmost (stern) portion of the boat cover 34. The main chamber portion 164a is straight in a lateral dimension but is curved in the vertical dimension as shown in FIGS. 12, 13B, and 14. Four of the example lateral chamber portions 164b are curved in one direction (up/down) and extend in lateral directions at substantially right angles relative to the longitudinal axis of the cover 34. Two of the example lateral chamber portions 164b are curved in two directions (up/down; laterally) and extend through angles of approximately 30 to 40 degrees relative to the longitudinal axis of the cover 34.

Figure 15:
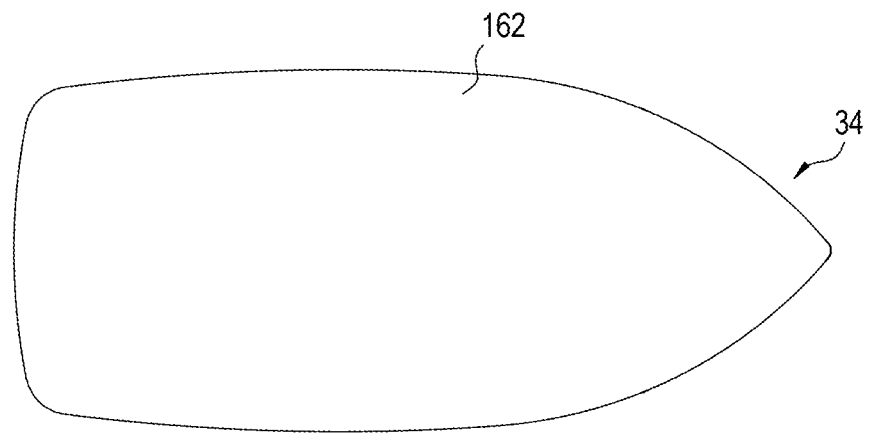
FIG. 15 is a top plan view of the first example cover system.

As shown in FIGS. 12, 14, and 15, the structural system 160 is thus sized, dimensioned, and configured based on the dimension of the example boat 22 to support the skin system 162 to cover the boat 22 from bow to stern and from port to starboard while also curving up to extend over and cover any structure (e.g., windshields, motors, ski racks, towing structures, electronics, and the like) extending from hull of the example boat 22. For vehicles other than the example boat 22, the structural system 160 and the skin system 162 may be sized, dimensioned, and configured to fit the size and shape of such other vehicles as appropriate.

With the inflator tube 152 connected to the chamber inlet 166, the inflator controller 154 controls the inflator 150 to maintain pressure within the at least one air chamber 164 within a predetermined pressure range based on a pressure signal generated by the pressure sensor 156. The predetermined pressure range is determined as necessary to maintain the air pressure within at least one air chamber 164 such that the structural system 160 supports the skin system 162 in the desired orientation relative to the boat 22. In the desired orientation, the skin system 162 protects an interior of the boat 22 by, for example, preventing entry of rain or snow into the interior of the boat 22 and/or blocking light from the sun from reaching components within the interior of the boat 22.

Figure 18:
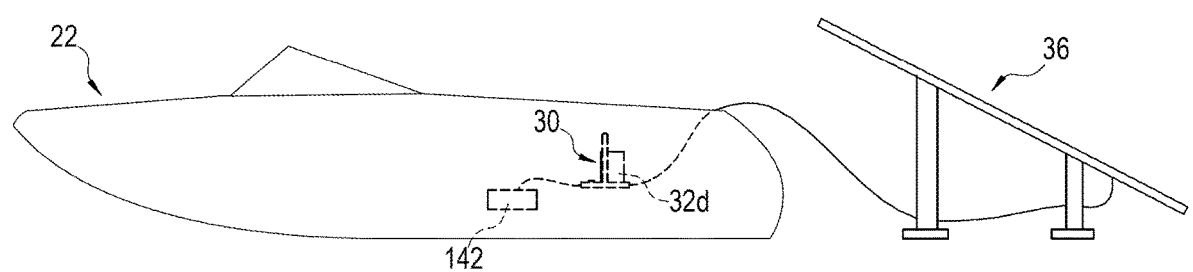
FIG. 18 is a partial schematic side elevation view illustrating the first example vehicle protection system in a fourth example configuration.

FIGS. 1 and 18 illustrate that the first example vehicle protection system 20 may be used in a third configuration to heat and/or dehumidify the interior of the boat 22. FIG. 1A illustrates that, with the first example vehicle protection system 20 in the third configuration, the example second auxiliary module 32*b* is a heater/dehumidifier module comprising the following functional components: a heater 170, a dehumidifier 172, and a space controller 174. FIG. 18 illustrates that a dehumidifier outlet tube 176 extends from the dehumidifier 172 to a sump region in which a sump pump 178 is located. The example heater 170 and dehumidifier 172 are electrically connected to a second auxiliary electrical connector 124*b* forming a part of the example second auxiliary module 32*b*. The second auxiliary electrical connector 124*b* is in turn electrically connected to the second hub electrical connector 52*b* of the hub system 30. The example heater 170 and dehumidifier 172 are thus electrically connected to the DC bus 80. In the first example vehicle protection system 20, the example space controller 174 is operably connected to the temperature sensor 76 and the humidity sensor 78 through the main controller 70. Alternatively, the temperature sensor 76 and the humidity sensor 78 may be included within the second auxiliary module 32 and directly connected to the space controller 174.

To facilitate programming and/or control of the second auxiliary module 32*b* (e.g., through the control panel 74), the example inflator controller 154 may be electrically connected, wirelessly or through wires as shown at 176, to the main controller 70. The space controller 174 is programmed to control the heater 170 and/or dehumidifier 172 based on one or more of temperature and humidity signals generated by the temperature sensor 76 and/or humidity sensor 78 to maintain temperature and/or humidity inside the boat 22 within predetermined ranges.

Figure 19:
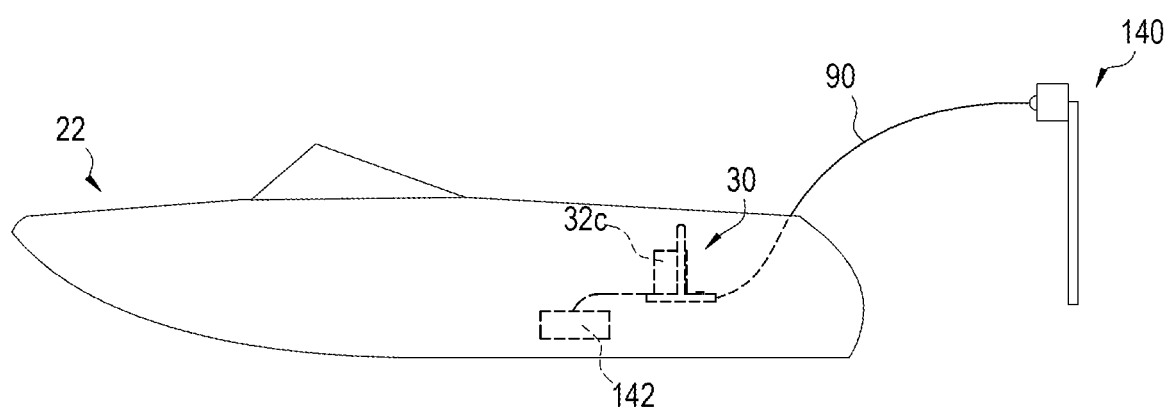
FIG. 19 is a partial schematic side elevation view illustrating the first example vehicle protection system in a fifth example configuration.

FIGS. 1 and 19 illustrate that the first example vehicle protection system 20 may be used in a fourth configuration to provide uninterruptible power to the battery 142 of the boat 22. FIG. 1A illustrates that, with the first example vehicle protection system 20 in the fourth configuration, the example third auxiliary module 32*c* is a standby power module comprising, as a functional component, a battery 180. The example battery 180 is electrically connected to a third auxiliary electrical connector 124*c* forming a part of the example third auxiliary module 32*c*. The third auxiliary electrical connector 124*c* is in turn electrically connected to the third hub electrical connector 52*c* of the hub system 30. The example battery 180 is thus electrically connected to the DC bus 80. The example third auxiliary module 32*c* may also contain a charger (not shown) similar to the charger 86 of the power management system 44 to condition the DC power signal on the DC bus 80 as appropriate for the battery 180.

To facilitate programming and/or control of the third auxiliary module 32*c* (e.g., through the control panel 74), the example battery 180 may be electrically connected, wirelessly or through wires, to the main controller 70. The example power management system 44 may provide standby power to at least one of the vehicle battery 142, of the first auxiliary module 32*a*, and the second auxiliary module 32*b*. Accordingly, if no other power source (e.g., shore power) is available, the third auxiliary module 32*c* may be configured to allow operation of the boat 22, the first auxiliary module 32*a*, and/or the second auxiliary module 32*b*.

Figure 20:
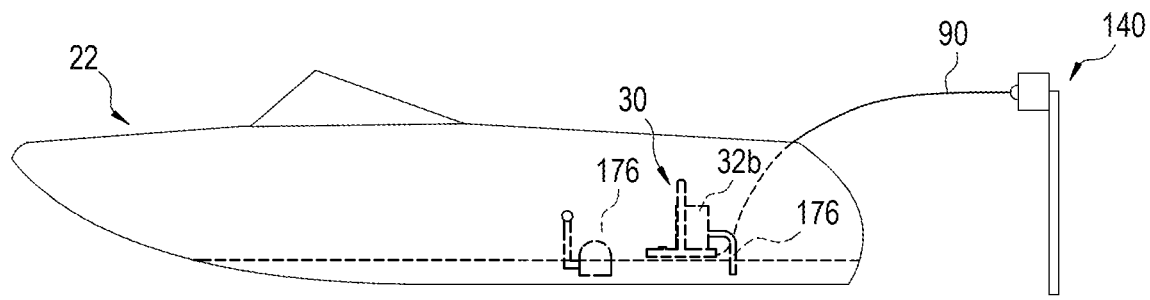
FIG. 20 is a partial schematic side elevation view illustrating the first example vehicle protection system in a sixth example configuration.

FIGS. 1 and 20 illustrate that the first example vehicle protection system 20 may be used in a fifth configuration in which solar power may be used at least in part to provide power to the vehicle battery 142, the first auxiliary module 32*a*, the second auxiliary module 32*b*, and/or the third auxiliary module 32*c*. FIG. 1A illustrates that the example fourth auxiliary module 32*c* comprises the following functional component: a converter 190 that is operatively connected to the photovoltaic array 36. The example converter 190 is also electrically connected to a fourth auxiliary electrical connector 124*c* forming a part of the example fourth auxiliary module 32*d*. The fourth auxiliary electrical connector 124*d* is in turn electrically connected to the fourth hub electrical connector 52*c* of the hub system 30. The example converter 90 is thus electrically connected to the DC bus 80. The example converter 90 generates a DC power signal appropriate for the DC bus 80 based on an output of the PV array 36.

To facilitate programming and/or control of the fourth auxiliary module 32*d* (e.g., through the control panel 74), the example converter 190 may be electrically connected, wirelessly or through wires, to the main controller 70. The example third auxiliary module 32*d* is thus capable of providing power to at least one of the vehicle battery 142, of the first auxiliary module 32*a*, the second auxiliary module 32*b*, and the third auxiliary module 32*c*. Accordingly, if no other power source (e.g., shore power) is available, the fourth auxiliary module 32*d* may be configured to allow operation of the boat 22, the first auxiliary module 32*a*, and/or the second auxiliary module 32*b* and to charge the battery 180 of the third auxiliary module 32*c*.

It should be apparent that the example vehicle protection system 20 can be operated in configurations other than those specifically described above. For example, one common implementation in a remote location (e.g., no shore power) is to combine a solar power module 32*d* with a standby power module 32*c*. Power can be accessible to the vehicle battery 142, the inflator module 32*a*, and/or the heater/dehumidifier module 32*c* from the photovoltaic array 36 when insolation levels are sufficient and from the battery 180 of the standby power module 32*c* when insolation levels are not sufficient. The use may thus determine which combination of auxiliary module(s) 32, including none, are appropriate for a particular boat 22 or other vehicle to be protected.

What is claimed is:

1. A vehicle protection system comprising:
 a cover comprising
  a structural system defining an air chamber, and
  a skin system;
 a hub system comprising
  a hub housing,
  at least one hub electrical connector supported by the hub housing, and
  a DC bus operatively connected to the at least one hub electrical connector; and at least one dehumidifier module comprising
a dehumidifier housing,
at least one auxiliary electrical connector supported by the auxiliary housing;
at least one inflator module comprising an inflator operatively connected to the air chamber of the structural system; and
a humidity sensor; whereby
the at least one hub housing supports the at least one dehumidifier housing relative to the hub housing such that at least one hub electrical connector engages the at least one auxiliary electrical connector of the hub housing;
the at least one hub housing supports the at least one inflator housing relative to the hub housing such that at least one hub electrical connector engages at the least one auxiliary electrical connector of the inflator housing; and
the inflator is operatively connected to the DC bus such that the inflator operates based on a DC power signal on the DC bus to introduce pressurized air into the air chamber of the structural system; and
the dehumidifier is operatively connected to the DC bus such that the dehumidifier operates in response to a humidity signal generated by the humidity sensor.

2. The vehicle protection system as recited in claim 1, in which the air chamber comprises:
a main portion extending along a longitudinal axis of the cover; and
at least one lateral portion extending at an angle to the longitudinal axis of the cover.

3. The vehicle protection system as recited in claim 1, in which the air chamber comprises:
a main portion extending along a longitudinal axis of the cover; and
a plurality of laterals portion extending at least one angle relative to the longitudinal axis of the cover.

4. The vehicle protection system as recited in claim 1, which the air chamber comprises:
a main portion extending along a longitudinal axis of the cover; and
a plurality of laterals portion extending to both sides of the longitudinal axis of the cover and at angles to the longitudinal axis of the cover.

5. The vehicle protection system as recited in claim 1, in which the hub system comprises a main controller operatively connected to the at least one dehumidifier module.

6. A vehicle protection system comprising:
a hub system comprising
a hub housing defining at least one hub guide portion,
a plurality of hub electrical connectors supported by the hub housing,
a DC bus operatively connected to the plurality of hub electrical connectors, and
a main controller comprising a humidity sensor; and
a plurality of auxiliary modules, where each auxiliary module comprises
an auxiliary housing defining,
at least one auxiliary electrical connector supported by the auxiliary housing, and
at least one functional component; whereby
at least one of the auxiliary modules is a dehumidifier module comprising a functional component comprising a dehumidifier;
at least one of the auxiliary modules comprises at least one functional component selected from the group of functional components comprising a heater, a battery, a solar power module, and an inflator;
each of the functional components is operatively connected to the DC bus through at least one auxiliary electrical connector and one of the hub electrical connectors;
each auxiliary housing is supported relative to the hub housing such that one hub electrical connector engages each auxiliary electrical connector; and
the main controller is operatively connected to the dehumidifier module such that the dehumidifier operates in response to a humidity signal generated by the humidity sensor.

7. The vehicle protection system as recited in claim 6, further comprising an inflatable cover defining an air chamber.

8. The vehicle protection system as recited in claim 6, in which the air chamber comprises:
a main portion extending along a longitudinal axis of the cover; and
at least one lateral portion extending at an angle to the longitudinal axis of the cover.

9. The vehicle protection system as recited in claim 6, in which the air chamber comprises:
a main portion extending along a longitudinal axis of the cover; and
a plurality of laterals portion extending at least one angle relative to the longitudinal axis of the cover.

* * * * *